(12) United States Patent
Weiler et al.

(10) Patent No.: US 6,381,926 B1
(45) Date of Patent: May 7, 2002

(54) HERMETICALLY SEALED CONTAINER WITH FRANGIBLE WEB AND LOCKING LUGS AND METHOD AND APPARATUS FOR MAKING SAME

(75) Inventors: Gerhard H. Weiler, South Barrington; Arjun Ramrakhyani, Northbrook, both of IL (US)

(73) Assignee: Automatic Liquid Packaging, Inc, Woodstock, IL (US)

( * ) Notice: Subject to any disclaimer, the term of this patent is extended or adjusted under 35 U.S.C. 154(b) by 0 days.

(21) Appl. No.: 09/736,638

(22) Filed: Dec. 14, 2000

Related U.S. Application Data

(62) Division of application No. 09/309,920, filed on May 11, 1999, now Pat. No. 6,168,413, which is a division of application No. 08/637,944, filed on Apr. 23, 1996, now Pat. No. 5,901,865.

(51) Int. Cl.[7] .............................................. B65B 43/00
(52) U.S. Cl. ............................. 53/452; 53/453; 53/420; 53/563
(58) Field of Search .......................... 53/452, 410, 420, 53/453, 561, 563, 140; 215/226, 48, 46

(56) References Cited

U.S. PATENT DOCUMENTS

| | | | |
|---|---|---|---|
| 3,597,793 A | | 8/1971 | Weiler et al. |
| 4,176,153 A | * | 11/1979 | Weiler et al. |
| 4,596,110 A | * | 6/1986 | Weiler .......................... 53/410 |
| 4,707,966 A | | 11/1987 | Weiler et al. |
| 4,790,117 A | * | 12/1988 | Hansen ........................ 53/410 |
| 4,886,175 A | * | 12/1989 | Schlaudecker .............. 215/226 |
| 5,188,250 A | * | 2/1993 | Kovacic et al. |
| 5,351,462 A | * | 10/1994 | Anderson et al. ............. 53/410 |

* cited by examiner

Primary Examiner—Rinaldi I. Rada
Assistant Examiner—Sameh Tawfik
(74) Attorney, Agent, or Firm—Olson & Hierl, Ltd.

(57) ABSTRACT

A hermetically sealed container is provided with a dispensing nozzle terminating in an aperture surrounded by locking lugs. A removable closure portion unitary with the dispensing nozzle and delineated by a frangible web that circumscribes the opening is provided as well so that the closure portion may be severed from the cap portion at the frangible web. An apparatus for fabricating such container is provided which includes a main mold assembly for molding the container body and dual seal mold assemblies for molding the container cap portion and container closure. The main seal mold assembly includes a top surface having a knife edge and an annular cavity. After the main seal mold assembly is closed during the molding process, a forming assembly including a mandrel is extended through the parison into abutting contact with the parison over the top surface of the main seal mold assembly. The mandrel is urged against the parison and the parison is urged against the knife edge and into the annular cavity for respectively forming the frangible web between the cap portion and closure portion of the container and molding the lugs on the dispensing nozzle of the container.

3 Claims, 7 Drawing Sheets

HERMETICALLY SEALED CONTAINER WITH FRANGIBLE WEB AND LOCKING LUGS AND METHOD AND APPARATUS FOR MAKING SAME

This application is a division of application Ser. No. 09/309,920, filed May 11, 1999, now U.S. Pat. No. 6,168,413, which, in turn, is a division of application Ser. No. 08/637,944, filed Apr. 23, 1996, now U.S. Pat. No. 5,901,865.

TECHNICAL FIELD OF THE INVENTION

This invention relates to a hermetically sealed container and, more particularly, to a hermetically sealed container provided with locking lugs for connection to a delivery system, as well as to the method and apparatus for molding, filling and sealing such container.

BACKGROUND OF THE INVENTION

Methods and apparatus for molding, filling and sealing hollow thermoplastic containers are illustrated in U.S. Pat. No. 3,597,793 to Weiler et al. and U.S. Pat. No. 4,707,966 to Weiler et al.

Of particular interest is the method for forming and filling a container, of the type disclosed in U.S. Pat. No. 3,597,793, which container includes a frangible web to allow a closure to be severed and removed from the container.

The method disclosed therein initially includes the step of extruding a tubular parison between two coacting main mold halves. The main mold halves are then closed around the parison. A segment of the extruded parison is severed at a location extending out of the closed mold halves and the severed segment is held open by a pair of holding jaws.

Next, a blowing and filling nozzle assembly is moved downwardly into the parison opening and between two sealing mold halves. The nozzle assembly includes a mandrel which is urged against the parison wall. The container is then formed by blowing gas to extend the parison segment outwardly against the walls of the main mold halves.

Thereafter, liquid is introduced into the formed container through a fill nozzle. After the container has been filled, the blowing and filling nozzle assembly is retracted and the sealing mold halves are moved together pinching the exposed top portion of the parison segment to form a unitary closure for the container and delineated from the container by a frangible web.

After the container has been sealed at the top, the main mold halves and the separate upper sealing mold halves are opened and the finished container is removed.

Although the above-discussed apparatus and method for forming a container with a frangible web is satisfactory in many applications, it is not adapted for the application where it is desirable to form and mold not only a frangible web between the container and the closure of the container but also to provide locking lugs around the access opening for the container.

It would thus be desirable to provide an apparatus and method for simultaneously molding a frangible web between the container and its unitary closure as well as locking lugs for connecting the container to a dispensing system such as an intravenous kit. The present invention meets these needs.

SUMMARY OF THE INVENTION

The container of the present invention includes a body portion, a cap portion unitary with the body portion provided with a dispensing nozzle defining an axial passageway into the body portion, as well as a closure portion which is removably secured to the cap portion.

The closure portion is delineated from the dispensing nozzle by a frangible web that circumscribes the dispensing nozzle. To open the container, the closure portion is severed and removed from the dispensing nozzle by grasping the closure portion and exerting a simultaneous twisting and lifting motion to the closure portion so as to cause the severance of the frangible web.

The dispensing nozzle terminates in an aperture surrounded by locking lugs and includes a controlled diameter inside passageway for connecting and locking the container to a dispensing system, such as an intravenous kit, after the closure portion has been removed from the nozzle.

A new and useful apparatus for fabricating this container includes a main mold assembly having two main mold halves defining a body cavity for molding the body of the container and a dual action seal mold assembly for closing the molded container.

The seal mold assembly includes a main seal mold assembly having two main seal mold halves that define a cap cavity for molding the container cap portion. The main seal mold assembly is located above the main mold assembly and the body cavity communicates with the cap cavity. The top surface of the main seal mold assembly is provided with an upstanding peripheral knife edge. The main seal mold assembly also defines an inner surface which defines the cap cavity and also provides an opening in the top surface. The peripheral knife edge on the top surface of the main seal mold assembly surrounds the opening but is spaced therefrom. The top surface also defines an annular cavity between the knife edge and the opening.

An auxiliary seal mold assembly, also having two seal mold halves, defines a closure cavity for molding a removable closure for the cap portion of the container that seals the container. The auxiliary seal mold assembly is located above the main seal mold assembly, and the closure cavity communicates with the body and cap cavities.

To make a container embodying the present invention, the parison is extruded between the main mold halves and the seal mold halves. After a segment of the parison is gripped by holding jaws, the main mold halves are closed about the parison to confine the parison segment therebetween. Then, the parison segment is severed above the auxiliary seal mold assembly to provide a top opening at the upper end of the parison.

A blowing and filling assembly, including a blowing and filling nozzle, is then introduced through the top opening of the parison and is positioned abutting the top surface of the main mold assembly. Gas is then blown through the blowing nozzle and into the parison segment to mold the body of the container. To fill the container, a product is discharged through the filling nozzle into the body of the molded container.

After the blowing and filling assembly has been retracted from the top opening of the parison, the main seal mold halves are closed about the parison segment to confine a portion of the parison segment therebetween and to mold the cap portion of the container.

A forming mandrel is then introduced through the top opening of the parison into contact with the parison over the top mold surface of the main seal mold assembly. The mandrel is pressed against the parison and the parison is urged against the knife edge defined by the main seal mold assembly and into the annular cavity in the top main seal mold surface to form a frangible web between the cap and the closure of the container, and to mold the locking lugs, respectively. In addition, the forming mandrel extends into the opening in the top surface of the main seal mold assembly and against the parison segment therein to form a container dispensing nozzle having a controlled inside diameter passageway.

The forming assembly is then retracted from the top opening of the parison segment, and the auxiliary seal mold halves are closed about the parison segment to confine a portion of the parison therebetween and to mold the closure of the container.

The main mold assembly, as well as the seal mold assemblies are then opened, and the molded container is removed.

There are other advantages and features of the present invention which will be more readily apparent from the following detailed description of the preferred embodiment of the invention, the accompanying drawings, and the appended claims.

DESCRIPTION OF THE PREFERRED EMBODIMENT

Figure 1:
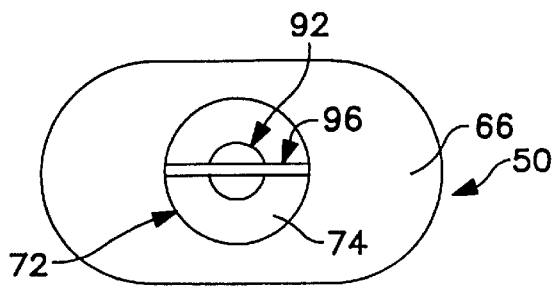
FIG. 1 is a top plan view of a molded container in accordance with the present invention.
Figure 2:
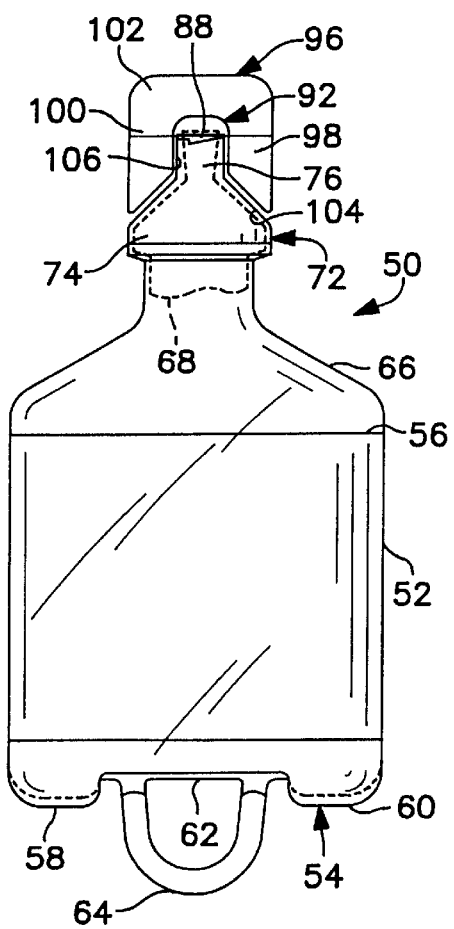
FIG. 2 is a front elevational view of the molded container of the present invention.
Figure 3:
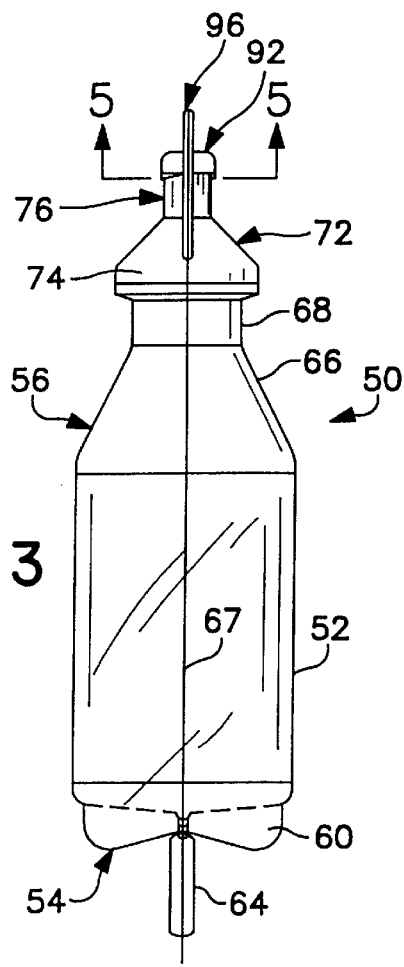
FIG. 3 is a side elevational view of the container of FIG. 2.
Figure 4:
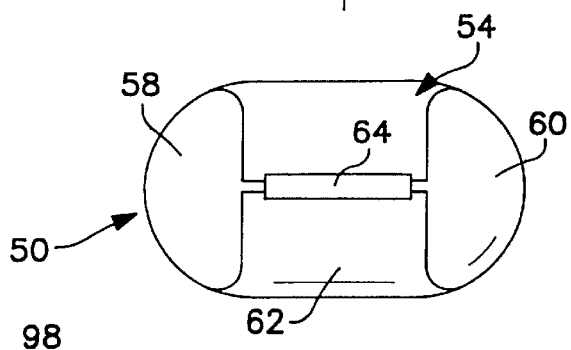
FIG. 4 is a bottom plan view of the container of FIG. 2.

The invention disclosed herein is, of course, susceptible of embodiment in many different forms. Shown in the drawings and described below in detail is a preferred embodiment of the invention. It is to be understood, however, that the present disclosure is an exemplification of the principles of the invention and does not limit the invention to the illustrated embodiment.

The precise shapes and sizes of the components described herein are not essential to the invention unless otherwise indicated.

For ease of description, the container of the invention and the apparatus of this invention for making the container will be described in a normal (upright) operating position and terms such as upper, lower, horizontal, etc., will be used with reference to this position. It will be understood, however, that the container and apparatus of this invention may be manufactured, stored, transported, used, and sold in an orientation other than the position described.

The apparatus of this invention has certain conventional drive and control mechanisms, the details of which are described in detail in U.S. Pat. No. 4,707,966 to Weiler et al. and further will be apparent to those having skill in the art and an understanding of the necessary functions of such mechanisms. Moreover, the method of this invention includes certain conventional steps, the details of which are also disclosed in U.S. Pat. No. 4,707,966 to Weiler et al. and further will be apparent to those having skill in the art and an understanding of the necessary steps of such method.

A thermoplastic container structure embodying the present invention will first be described. This will be followed by a description of an apparatus and method for molding, filling, and sealing the container.

A formed, filled, and hermetically sealed container 50 of the present invention is illustrated in FIGS. 1–4. The container 50 is preferably fabricated from conventional thermoplastic molding materials such as polyethylene (low or high density), polypropylene, and the like materials compatible with the container contents.

The teachings of the present invention find application in the production of filled and unfilled containers having a wide variety of shapes and sizes. Container 50 is an example of one such container and includes a hollow body portion 52 having a bottom surface 54 and a top 56, a cap portion 72 that terminates in a dispensing nozzle 76, and a closure portion 92 that seals dispensing nozzle 76. The container bottom 54 includes two humped end surfaces 58 and 60 and a flat surface or land 62 therebetween. A generally U-shaped support ring 64 extends outwardly away from the flat surface 62. The ring 64 is disposed generally co-planar with the mold parting line 67 (FIG. 3) of container 50. The top 56 of container body portion 52 terminates in a neck 66 unitary therewith which includes a generally cylindrical throat 68 defining a hollow passageway 70 (FIG. 6) for dispensing container contents.

Throat 68 in turn, terminates in cap portion 72 unitary therewith. Cap portion 72 is provided with dispensing nozzle 76 which, in turn, is sealed by closure portion 92. Cap portion 72, nozzle 76 and closure portion 92 are unitary with one another, but closure portion 92 is removable from dispensing nozzle 76 upon fracture of a frangible web that removably connects closure portion 92 to dispensing nozzle 76.

A grip tab 96 in the shape of an inverted "U" (FIGS. 2 and 3) surrounds the closure portion 92. Tab 96 includes two spaced apart wings 98 and 100 and a bridge 102 therebetween. Bridge 102 is unitary with and extends generally longitudinally above the top of closure portion 92. Wings 98 and 100 are unitary with opposite ends of the bridge 102 and extend generally vertically downwardly therefrom. Wings 98 and 100 terminate in an inclined end surface 104 spaced from and positioned generally adjacent and parallel to the frustoconical base 74 of cap portion 72. Each of the wings 98 and 100 also includes an inner surface 106 spaced from and positioned generally adjacent and parallel to the dispensing nozzle 76.

Figure 6:
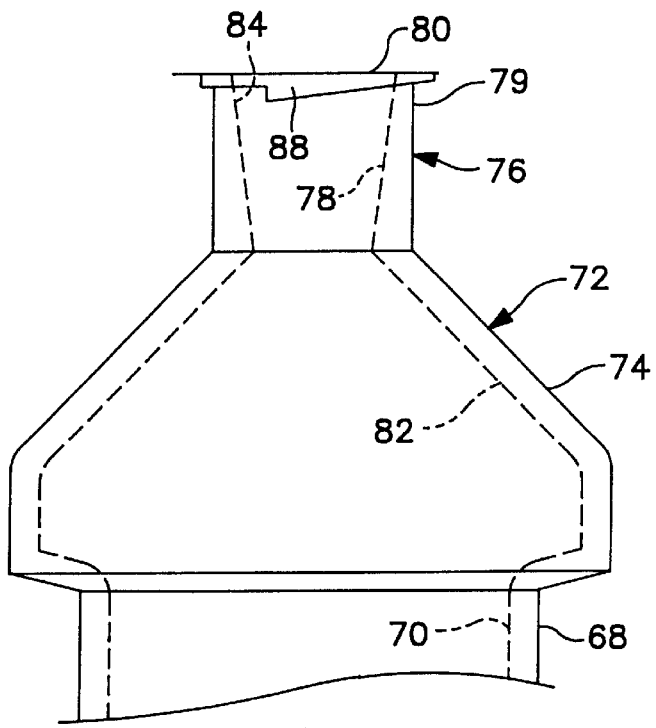
FIG. 6 is an enlarged fragmentary front elevational view of the cap portion and dispensing nozzle of the container of FIG. 2 with the cap removed therefrom.

The throat 68 of neck 66 is unitary with cap portion 72. As shown in FIG. 6, cap portion 72 includes a substantially frustoconical base 74 unitary with throat 68 and a generally cylindrical dispensing nozzle 76 unitary with and extending in a direction away from the base 74.

Dispensing nozzle 76 includes an inner surface 78, an outer surface 79 and a top peripheral surface 80. Inner surface 78 defines an open, axial passageway in communication with a passageway 82 in base 74 which in turn is in communication with the passageway 70 and the hollow body portion 52 of container 50. Inner surface 78 of dispensing nozzle 76 is tapered inwardly from the top end 80 towards the base 74 so as to receive and seat a draining spike.

Figure 5:
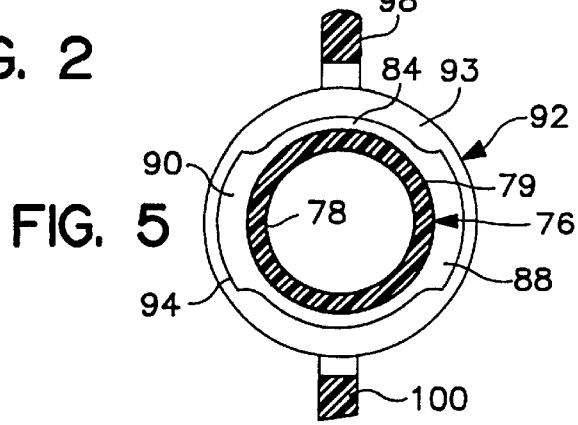
FIG. 5 is a cross-section of the molded container taken generally along the plane 5—5 in FIG. 3.
Figure 7:
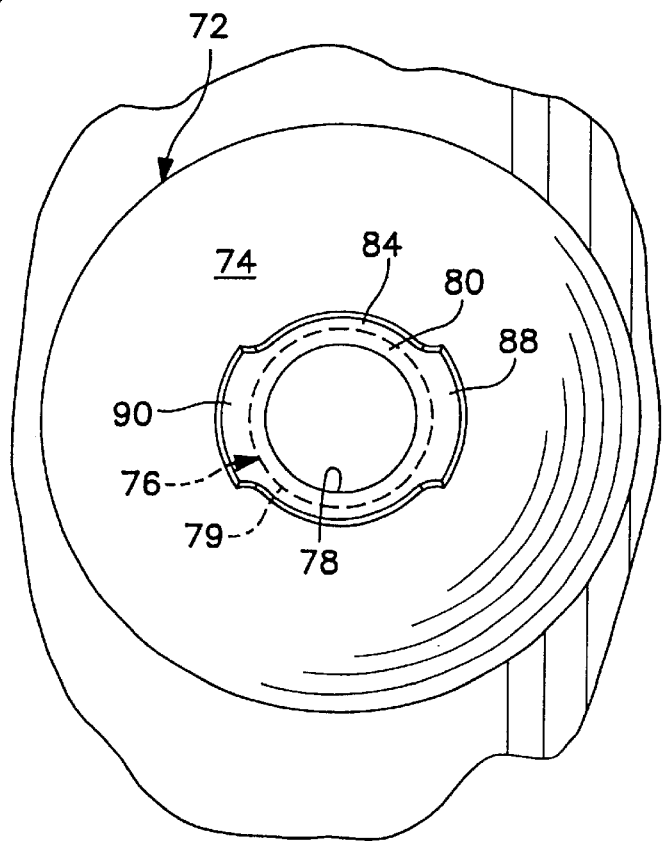
FIG. 7 is a enlarged fragmentary top plan view of the cap portion and dispensing nozzle of the container of FIG. 2 with the cap removed therefrom.

As illustrated in FIGS. 5–7, a lip 84 extends radially and circumferentially outwardly from the outer surface 79 of dispensing nozzle 76 about the top open distal end 80 thereof which defines an axial access aperture. A pair of diametrically opposed ear-shaped locking lugs 88 and 90 extend radially outwardly from the lip 84.

As stated hereinabove, closure portion 92 is unitary with nozzle 76. In particular, closure portion 92 includes a bottom circumferential edge 93 (FIG. 5) which is unitary with the lip 84 and lugs 88 and 90 on dispensing nozzle 76. The lip 84 and lugs 88 and 90 are delineated from the bottom circumferential edge 93 of closure portion 92 by a frangible web 94 which is unitary with dispensing nozzle 76 and closure portion 92 and which surrounds the peripheral edge of lip 84 and lugs 88 and 90.

To dispense container contents, closure portion 92 is severed and removed from the nozzle 76 by grasping the wings 98 and 100 of tab 96 and then exerting a simultaneous twisting and lifting motion to the closure portion 92 so as to break frangible web 94. Once the closure portion 92 has been removed, a Luer™ fitting or a draining spike (not shown) may be secured to nozzle 76. Lugs 88 and 90 on dispensing nozzle 76 are sized to engage the Luer™ lock threads of such a Luer™ fitting and the inner surface 78 of dispensing nozzle 76 is adapted to receive a draining spike. Preferably, the inner passageway defined by surface 78 has controlled dimensions as will be discussed in greater detail hereinbelow.

The apparatus and method for molding containers embodying the present invention such as container 50 will next be discussed with reference to the schematic, partially cross-sectional diagrams of FIGS. 8–17. These Figures show the apparatus and progressively illustrate the sequence of the steps of the method of container fabrication.

Figure 8:
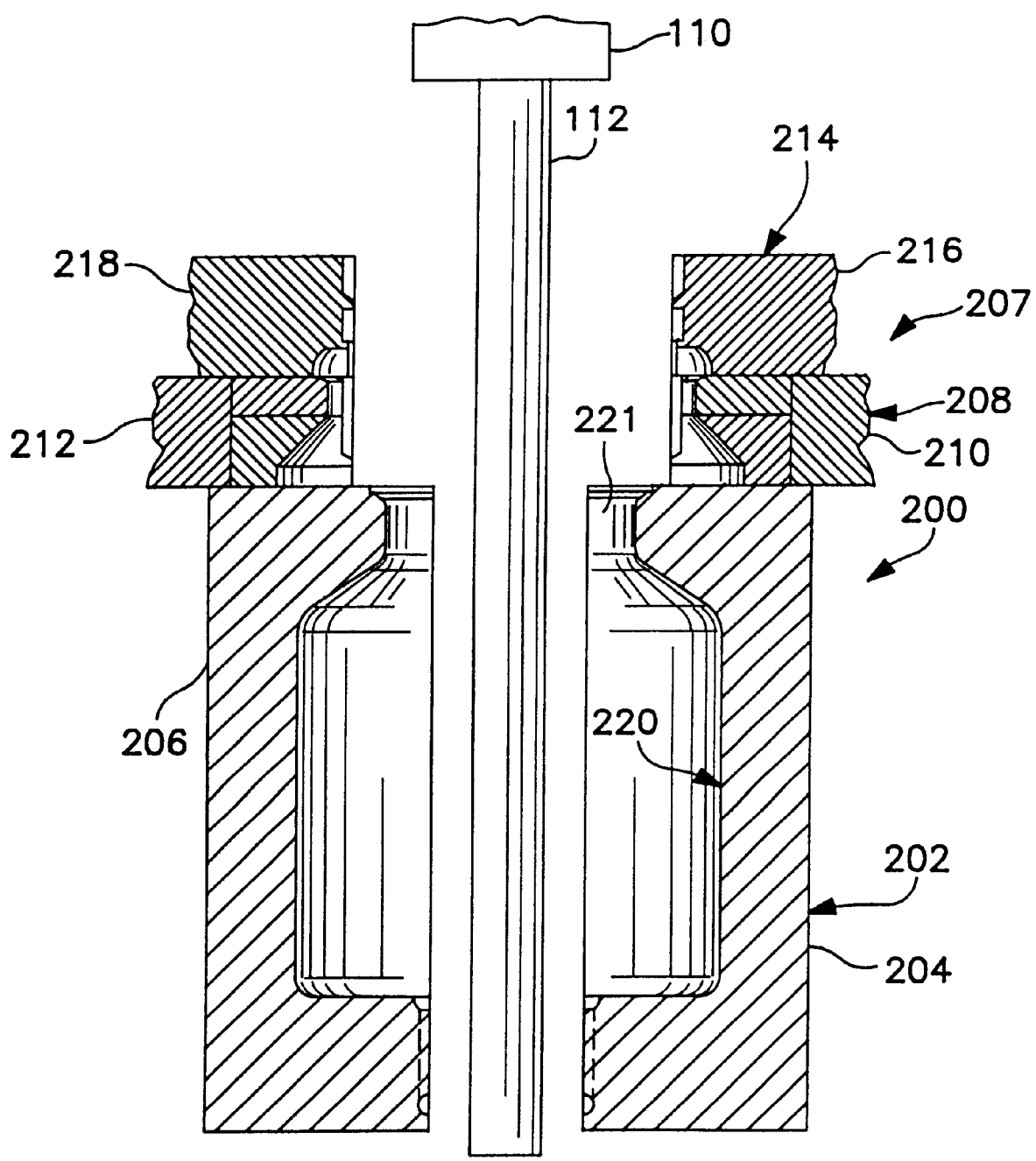
FIG. 8 is a fragmentary schematic diagram, partly in section, generally illustrating the apparatus of the present invention for molding, filling and sealing the container of FIGS. 1–4 and, more particularly, the parison extrusion step of the method of the present invention for molding, filling and sealing the container of FIGS. 1–4.

As best illustrated in FIG. 8, the method of forming the container 50 is initiated at an extruder head 110 of conventional design which is adapted to extrude length of parison 112 in the form of a elongated, hollow tube of a semimolten thermoplastic material.

A mold assembly 200 is positioned in spaced relationship from and around the extruded parison 112. The mold assembly 200 includes a lower main mold assembly 202 including a pair of main coacting mold halves 204 and 206, a seal mold assembly 207 including a main seal mold assembly 208 having a pair of coacting main seal mold halves 210 and 212, and an auxiliary seal mold assembly 214 having a pair of coacting auxiliary seal mold halves 216 and 218. Main seal mold assembly 208 and auxiliary seal mold assembly 214 may be parts of the same assembly or may be separate seal mold assemblies, as desired.

Main seal mold halves 210 and 212 are positioned above and in sliding engagement with the tops of the main mold halves 204 and 206. Main seal mold halves 210 and 212 are laterally movable relative to and independent of the main mold halves 204 and 206.

Auxiliary seal mold halves 216 and 218 are positioned above and in sliding relationship with the main seal mold halves 210 and 212 of main seal mold assembly 208. Auxiliary seal mold halves 216 and 218 are movable independently of the main seal mold halves 210 and 212 and also independently of the main mold halves 204 and 206.

Typically, more than one container 50 is fabricated at one time in a multi-cavity mold assembly. For ease of description, however, only a single mold cavity is illustrated. It is to be realized, however, that the mold assembly 200 may include a plurality of mold assemblies aligned in a row and that a plurality of extruder heads 110 may be provided in a row for extruding a length of parison between each of the mold assemblies.

According to the invention, and referring to FIG. 8, parison 112 is initially extruded and depends vertically downwardly between each of the mold assemblies 202, 208 and 214. The main mold halves 204 and 206 are then moved together from the main mold open position illustrated in FIG. 8 to the main mold closed position illustrated in FIG. 9 by suitable means, such as a pneumatic or hydraulic actuator or actuators (not illustrated). The main mold halves 204 and 206 cooperate when moved together to define a body cavity 220 and a top cylindrical opening 221 (FIG. 8).

Figure 9:
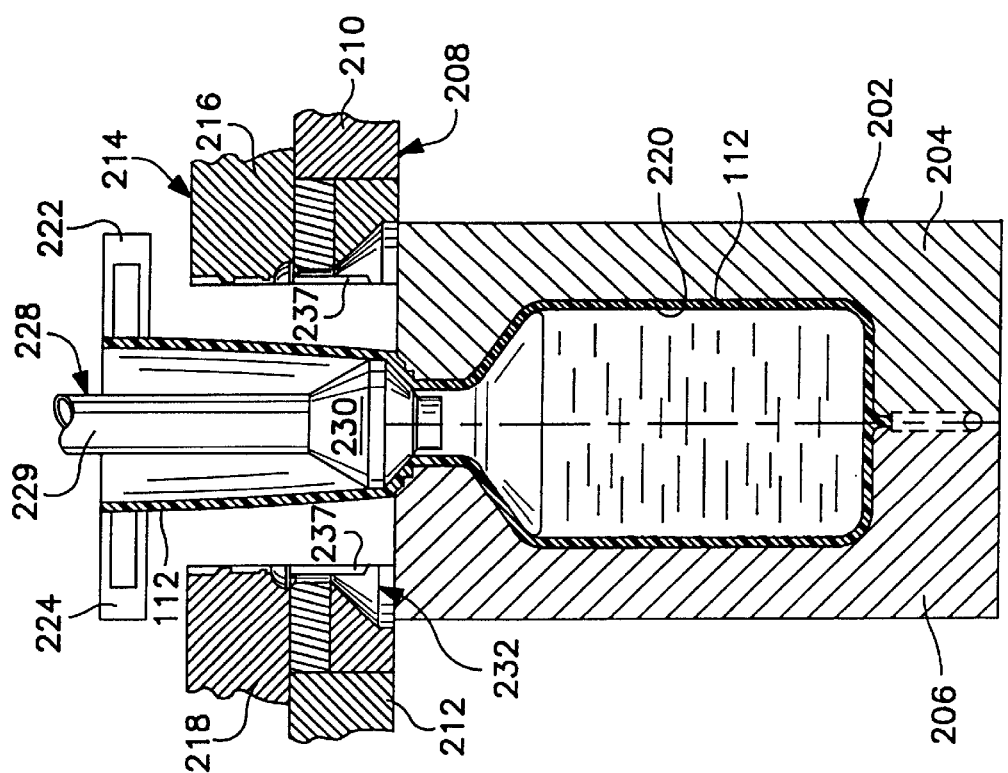
FIG. 9 is another fragmentary schematic diagram, partly in section, generally illustrating the apparatus of the present invention and the step wherein a blowing and filing nozzle is introduced to form and fill the container body.
Figure 12:
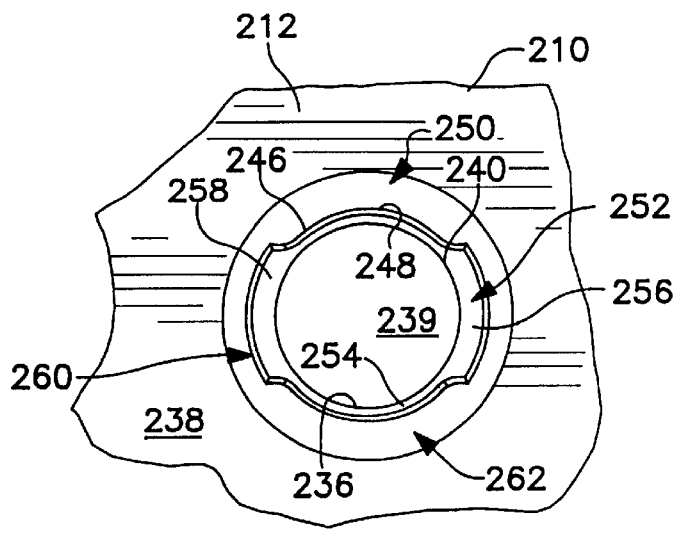
FIG. 12 is an enlarged fragmentary plan view of the top surface of the main seal mold assembly depicted in FIG. 11 with the mandrel retracted therefrom and the parison removed therefrom.
Figure 13:
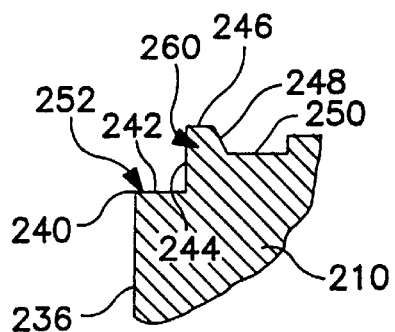
FIG. 13 is an enlarged fragmentary vertical cross-section of a portion of the top surface of the main seal mold assembly illustrated in FIG. 11.

Next, and as also illustrated in FIG. 9, the upper end of the parison 112 extending above the seal mold assemblies 208 and 214 is gripped by vacuum operable jaws 222 and 224. With the upper end of the parison 112 prevented from collapsing by the holding jaws 222 and 224, a segment of parison 112 is then severed as illustrated in FIG. 9 above the holding jaws 222 and 224 by means of a moving cutter means, such as a hot wire, blade, or the like (not illustrated).

Initially, and as also illustrated in FIG. 9, a blowing and filling assembly 228 including a mandrel 229 and a nozzle 230 is moved into registry with the opening at the upper end of the severed segment of parison 112 and thereafter extended downwardly into the opening at the upper end of the severed segment of parison 112. The nozzle 230 is then positioned abutting the opening 221 in the top of closed main mold assembly 202.

Mandrel 229 preferably includes a conventional blowing tube and a conventional filling tube (neither being visible in FIG. 9). In operation, gas under pressure, such as air or the like, is then discharged through the mandrel blowing tube and the nozzle 230 into the interior of parison 112 to expand the parison segment 112 outwardly against the walls of the cavity 220 defined by the main mold assembly 202 to mold the sidewall of container body portion 52, the container bottom 54, the ring 64, and the neck 66.

Next, the filling tube inside the composite mandrel 229 is reciprocated downwardly to open a vent passage in the mandrel 229 to permit venting of the compressed gas out of the molded container. Subsequently, the blowing tube is moved downwardly a small amount within the mandrel 229 to open a product dispensing valve and permit the product to be injected under pressure from the filling tube, through the nozzle 230 and into the formed container body portion 52.

After the formed container body portion 52 has been filled with the desired amount of product, the composite mandrel 229 is withdrawn from the open end of the segment of parison 112.

Figure 10:
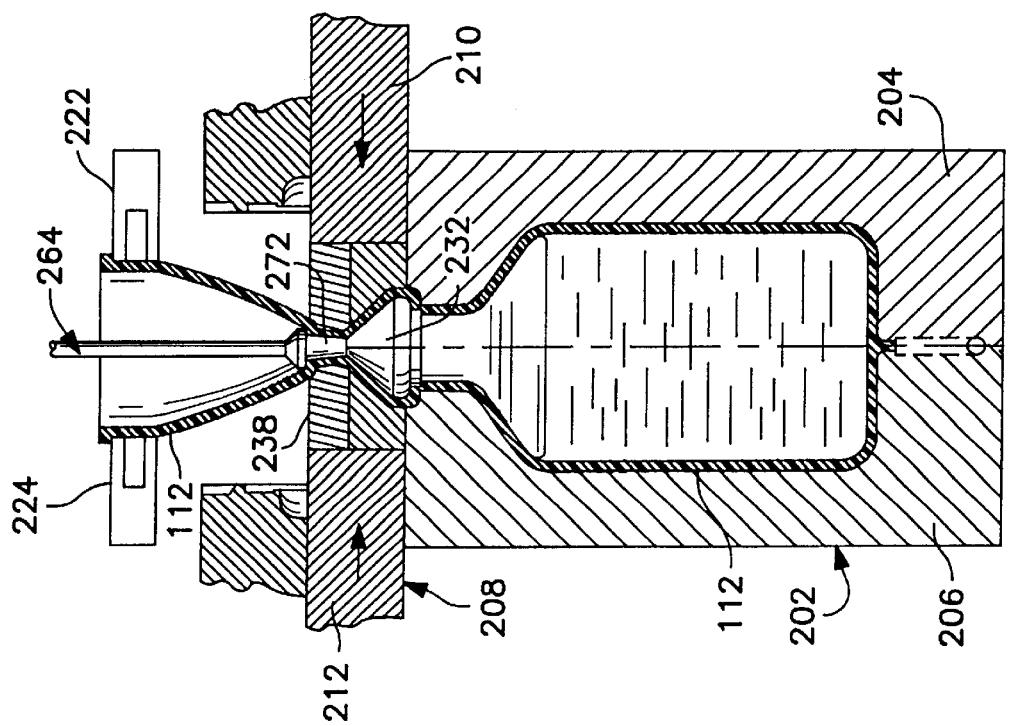
FIG. 10 is yet another fragmentary schematic diagram, partly in section, illustrating the apparatus of the present invention and, more particularly, the step wherein the main seal mold halves are brought together to form the cap portion of the container and a mandrel is introduced for forming the frangible web and lugs around the container dispensing nozzle.
Figure 11:
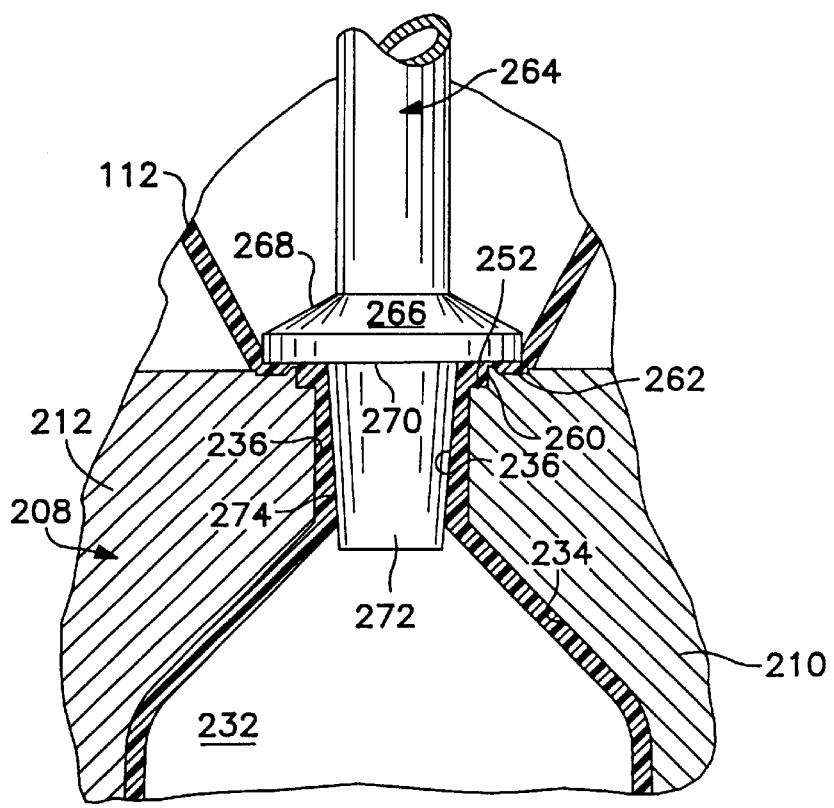
FIG. 11 is an enlarged fragmentary schematic diagram, partly in section, of the mandrel and main seal mold assembly as illustrated in FIG. 10.

Then, the main seal mold halves 210 and 212 are moved to the closed position illustrated in FIGS. 10 and 11 by suitable conventional actuators (not shown) to a sealing position wherein the mold halves 210 and 212 cooperate together to define a cap cavity 232 in communication with the body cavity 220 for forming and molding the sidewall of the cap portion 72 of container 50. Referring to FIG. 11, cap cavity 232 includes an inner frustoconical surface 234 and an inner cylindrical surface 236 unitary with and extending upwardly from surface 234. The inner surfaces 234 and 236 also include an axial groove 237 (FIG. 9). The segment of parison 112 between seal mold halves 210 and 212 engages the surfaces 234 and 236 of cavity 232 when the mold halves 210 and 212 are closed to define and mold the frustoconical base 74 and dispensing nozzle 76, respectively, of cap portion 72. Moreover, when the main seal mold halves 210 and 212 are closed, the groove 237 is filled with the thermoplastic material that constitutes parison 112 to define and mold the peripheral edges of wings 98 and 100 of grip tab 96.

The main seal mold halves 210 and 212 also cooperate when moved together to define a top horizontal surface 238. The inner cylindrical surface 236 of main seal mold assembly 208 terminates at the top surface 238 (FIG. 12) to define a generally circular opening 239 with a circumferential edge 240.

The top surface 238 includes a generally horizontal recessed surface 242 (FIG. 13) which extends radially outwardly from, and circumferentially around, the edge 240. The surface 242 is co-planar with the top of opening 239 defined by inner cylindrical surface 236. A sidewall 244 extends generally outwardly and axially away from the end of recessed surface 242 opposite the end thereof connected to edge 240. Sidewall 244 also extends circumferentially around edge 240. A generally horizontal top wall 246, which is parallel to but spaced axially and radially from surface 242, extends radially outwardly from the end of wall 246 opposite the end thereof connected to wall 242 and circumferentially around edge 240. A sidewall 248 extends radially and angularly outwardly and downwardly from the end of top wall 246 opposite the end thereof connected to sidewall 244. Sidewall 248 likewise extends circumferentially around edge 240. Moreover, a generally horizontal surface 250 extends radially outwardly from the end of sidewall 248 opposite the end thereof connected to top wall 246. Surface 250 also extends circumferentially around edge 240. Surface 250 is generally parallel to surfaces 242 and 246 but is spaced axially and radially therefrom.

The sidewall 248 and surface 250 define a closure edge cavity 262 extending circumferentially around edge 240 of opening 239 and radially outwardly from the periphery of knife edge 260.

Surface 242 and sidewall 244 define an annular cavity 252 including a ring-shaped portion 254 which extends circumferentially around edge 240 of opening 239 and two opposed ears 256 and 258 that extend radially outwardly from the periphery of ring-shaped portion 254.

The sidewalls 244 and 248 and the top wall 246 therebetween define an upstanding peripheral knife edge 260 protruding axially outwardly from the top surface 238 of main seal mold assembly 208. Knife edge 260 forms the frangible web for the container and is spaced from the edge 240 of opening 239 and extends circumferentially around annular cavity 252 and, more particularly, extends around the peripheral edge of the ring-shaped portion 254 and ears 258 and 260 of annular cavity 252.

Knife edge 260 may include any other suitable configuration including the configuration where sidewalls 244 and 248 extend angularly outwardly from the surface 238 and converge above the surface 238 to define a knife point.

Referring back to FIGS. 10 and 11, after the main seal mold halves 210 and 212 have been moved together to form the sidewall of cap portion 72, a forming assembly 264 including a mandrel 266 is moved into registry with the opening at the upper end of the severed segment of parison 112 and thereafter extended downwardly into the open upper end thereof. The mandrel 266 includes a base 268 having a lower flat radial surface 270 and a frustoconical molding member 272 unitary with and extending away from the radial surface 270 in a direction opposite the base 268. Molding member 272 includes an outer frustoconical surface 274 which converges in the direction away from the radial surface 270.

Mandrel 266 is extended downwardly into the open upper end of parison 112 and is positioned such that the radial surface 270 of base 268 abuts and urges against the parison 112 over the top surface 238 of main seal mold assembly 208 and, more particularly, against the parison 112 overlying the knife edge 260 and the annular and closure edge cavities 252 and 262, respectively. The pressing action forces the parison 112 against the top wall 246 of knife edge 260 which, in turn, causes a substantial reduction in the thickness of the parison 112 being pressed against the knife edge 260. As a result, the segment of parison 112 overlying the knife edge 260 is almost but not quite severed and thus the frangible web 94 (FIG. 5) of container 50 is formed.

Urging of the parison 112 against the top surface 238 of main seal mold assembly 208 also causes the thermoplastic material of parison 112 to fill the annular cavity 252 so as to mold the lip 84 and lugs 88 and 90 of cap portion 72. In particular, and referring to FIGS. 5–7 and 12, the ring shaped portion 254 of annular cavity 252 molds the lip 84 of cap portion 72 while the ears 256 and 258 of cavity 252 mold the lugs 88 and 90 of cap portion 72, respectively. The urging of the parison 112 against the top surface 238 of main seal mold assembly 208 also causes the thermoplastic material of parison 112 to fill the closure edge cavity 262 to mold the bottom circumferential edge 93 of closure 92 (FIG. 5).

The molding member 272 of forming assembly 264 (FIG. 11) is inserted into the opening 239 in the top surface 238 of main seal mold assembly 208 and the parison 112 abutting the inner surface 236 of main seal mold assembly 208 is pressed against the inner surface 236 to form and mold the controlled inside diameter surface 78 of cap portion 72.

Figure 15:
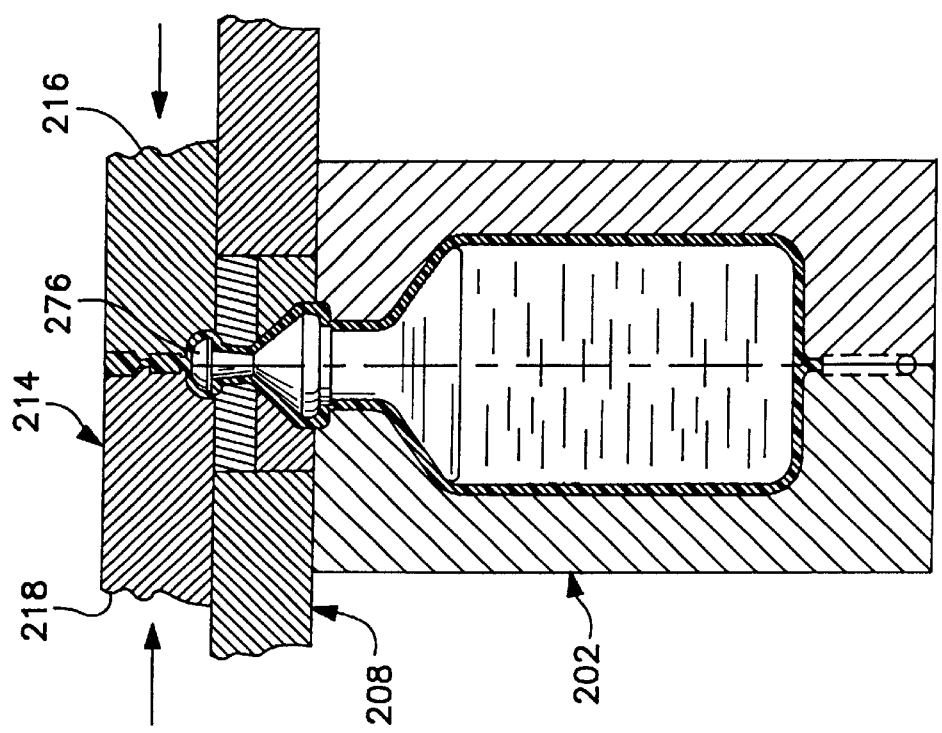
FIG. 15 is a further fragmentary schematic diagram, partly in section, illustrating the step of the method of the present invention wherein the auxiliary seal mold halves are brought together to mold the container closure.
Figure 14:
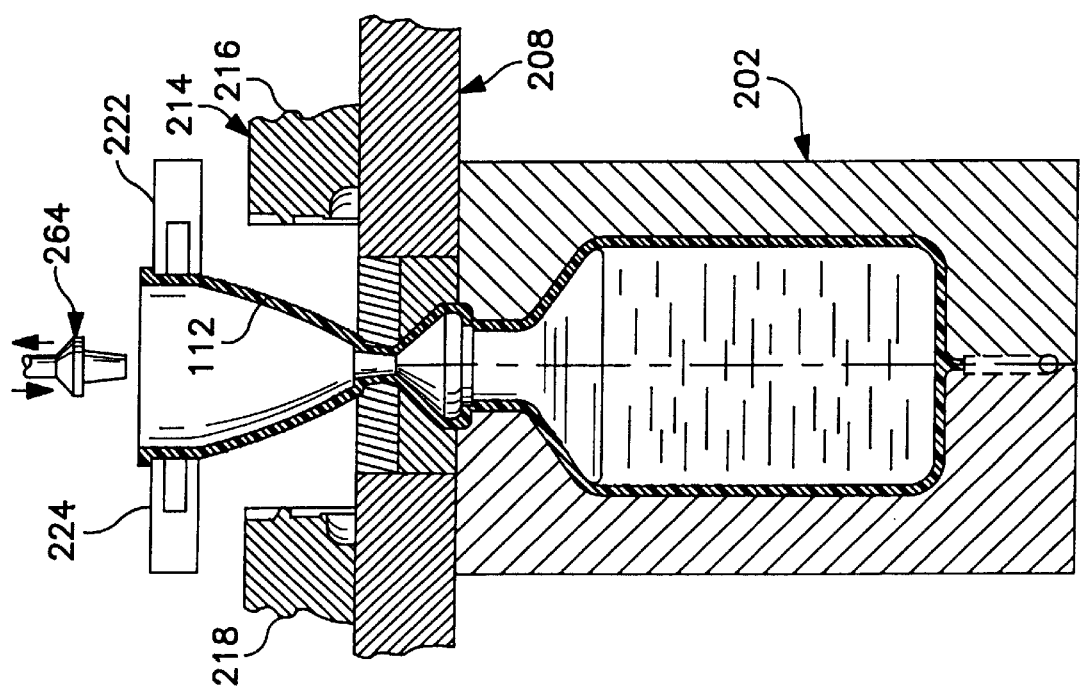
FIG. 14 is yet another fragmentary schematic diagram, partly in section, illustrating the apparatus of the present invention and, more particularly, the step of the method of the present invention wherein the mandrel is removed therefrom.
Figure 16:
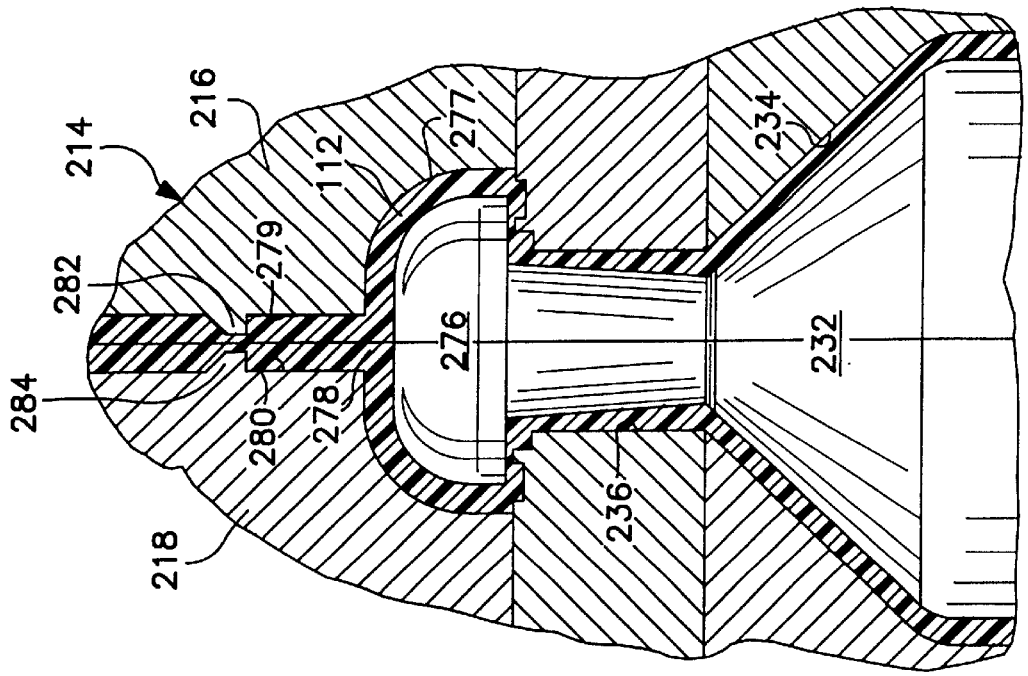
FIG. 16 is an enlarged fragmentary schematic diagram, partly in section, of the main and auxiliary seal mold assemblies in their respective closed position as illustrated in FIG. 15.

The forming assembly 264 is then retracted out of the open upper end of parison 112 (FIG. 14) and the auxiliary seal mold halves 216 and 218 are moved to the closed position illustrated in FIGS. 15 and 16, the sealing position. The auxiliary seal mold halves 216 and 218 cooperate to define a closure cavity 276 in communication with cap cavity 232 and body cavity 220. Closure cavity 276 includes a closure-complementary inner surface 277 for molding the side wall of closure 92 and sealing the closure 92 to the cap portion 72, and a tab cavity 278, located centrally above and in communication with the closure cavity 276 for molding the bridge 102 of grip tab 96. The top cavity 278 is defined by opposed flat axial inner surfaces 279 and 280 on auxiliary seal mold halves 216 and 218 respectively. Knife edges 280 and 282 extend radially outwardly from the inner surfaces 279 and 280 respectively of tab cavity 278 for forming a frangible web 286 along the top edge of grip tab 96.

Figure 17:
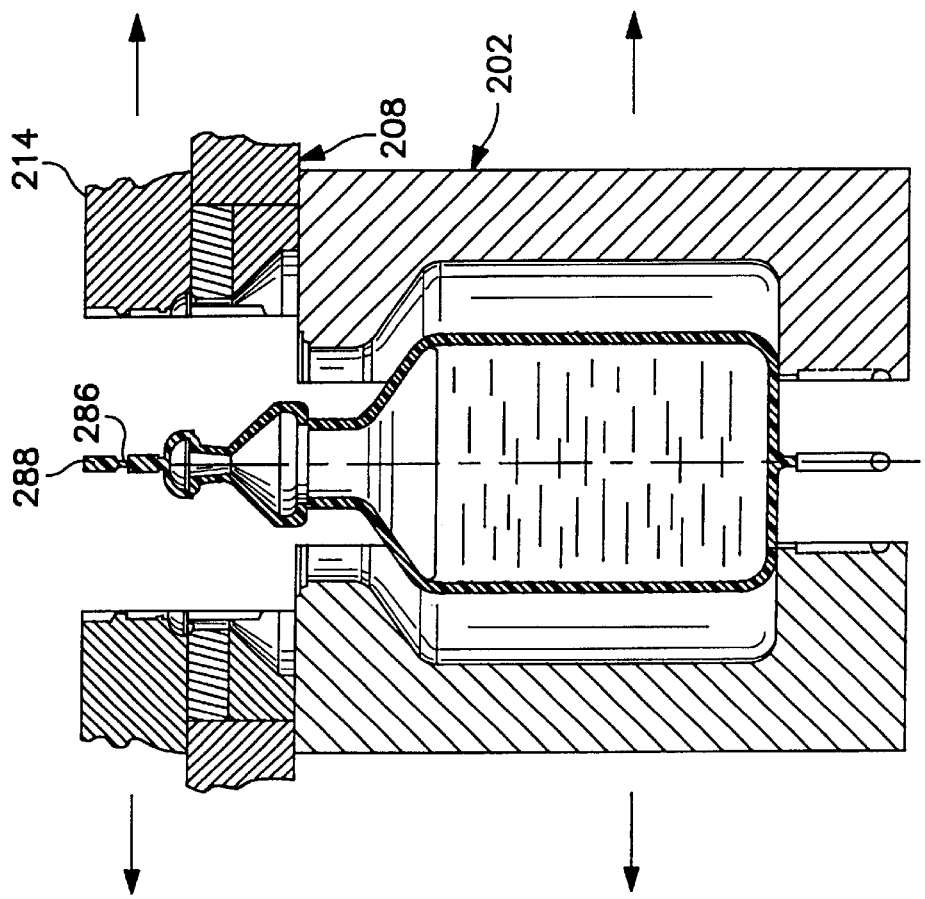
FIG. 17 is a fragmentary schematic diagram, partly in section, illustrating the apparatus of the present invention and, more particularly, the step wherein all of the mold assemblies are opened to allow removal of the completed container.

After the container closure 92 has been molded and the container 50 and its contents thus sealed within the container body portion 52, the three mold assemblies 202, 208 and 214 are opened as illustrated in FIG. 17 and the formed, filled and sealed container 50 may be removed and deflashed by suitable convention means.

During deflashing, the projecting parison flash (at the bottom of the container 50, around the sides of the container, and the upwardly extending portion 288 of the parison 112 above the grip tab 96 of closure 92 is broken away at the frangible web 286 to provide a deflashed container substantially as illustrated in FIGS. 1–4.

We claim:

1. A method of fabricating a filled, hermetically sealed container, and comprising the steps of:
   (a) providing a main mold assembly having two main mold halves together defining a body cavity for the container;
   (b) providing a main seal mold assembly having two main seal mold halves together defining a cap cavity for molding a cap portion of the container, said main seal mold assembly being located above said main mold assembly and said body cavity communicating with said cap cavity, said main seal mold assembly including a top surface having an upstanding knife edge extending therefrom;
   (c) providing an auxiliary seal mold assembly having two auxiliary seal mold halves together defining a closure cavity for a closure of the container, said auxiliary seal mold assembly being located above said main seal mold assembly and said closure cavity communicating with said body and cap cavities;
   (d) extruding and extending a parison vertically between said main mold halves and said main and auxiliary seal mold halves;
   (e) closing said main mold halves about the parison to confine a segment of the parison between said main mold halves;
   (f) severing the parison segment above the auxiliary seal mold assembly to provide an opening at the upper end of the parison segment;
   (g) providing a blowing and filling assembly including a blowing and filling nozzle;
   (h) extending said blowing and filling assembly through the top opening in the parison;
   (i) blowing gas through said blowing nozzle and into the parison segment to mold the body of the container;
   (j) discharging a product through the filing nozzle into the body of the molded container to fill the container;
   (k) retracting the blowing and filling assembly from the top opening of the parison;
   (l) closing said main seal mold halves about the parison segment to confine a portion of the parison segment therebetween to mold the cap portion of the container;
   (m) providing a forming assembly including a mandrel having a lower radial surface;
   (n) extending said mandrel through the top opening in the parison segment into abutting relationship with the parison over said top surface of said main seal mold assembly;
   (o) urging said lower radial surface of said mandrel against the parison for pressing said parison against said knife edge on said top surface of said main seal mold for forming a frangible web between the cap portion and the closure of the container;
   (p) retracting the forming assembly from the top opening of the parison segment;
   (q) closing said auxiliary seal mold halves about the parison segment to confine a portion of the parison segment therebetween to mold the closure of the container and seal the cap portion of the container to the closure of the container;
   (r) opening said main mold assembly, and said main seal mold assembly and said auxiliary seal mold assembly; and
   (s) removing the molded container.

2. The method of claim 1, wherein said main seal mold assembly includes an inner surface defining said cap cavity, said inner surface terminating on said top surface of said main seal mold assembly to define an opening in said top surface, said knife edge on said top surface of said main seal mold assembly being spaced from said opening, said top surface further including an annular cavity between said knife edge and said opening and extending circumferentially around said opening, the method further comprising the step of urging said mandrel against the parison over said top surface of said main seal mold assembly into said annular cavity for molding a lip and lugs on said cap portion of said container.

3. The method of claim 2, wherein the cap portion of the container has a controlled diameter inner passageway, said mandrel including a molding member having a controlled diameter outer surface, the method further comprising the step of extending said molding member into said opening in said top surface of said main seal mold assembly and urging said molding member against the parison abutting the inner surface of said cap portion as said lower radial surface of said mandrel is urged against the parison over said top surface of said main seal mold assembly to form the controlled diameter inner passageway of said cap portion of said container.

* * * * *